W. H. BUTTERWORTH.
Thrashing Machine.

No. 101,578. Patented April 5, 1870.

Witnesses.
Harry King
C. L. Evart

Inventor.
Wm H. Butterworth
per Alexander Mason
Attys.

United States Patent Office.

WILLIAM H. BUTTERWORTH, OF TRENTON, NEW JERSEY.

Letters Patent No. 101,578, dated April 5, 1870.

IMPROVEMENT IN THRASHING-MACHINES.

The Schedule referred to in these Letters Patent and making part of the same.

*To all whom it may concern:*

Be it known that I, WILLIAM H. BUTTERWORTH, of Trenton, in the county of Mercer and in the State of New Jersey, have invented certain new and useful Improvements in Thrashing-Machines; and do hereby declare that the following is full, clear, and exact description thereof, reference being had to the accompanying drawings and to the letters of reference marked thereon making a part of this specification.

My invention relates to an improvement in dusters for undershot thrashing-machines; that is, thrashing-machines that have the concave below the thrashing-cylinder, and the rotation of the cylinder being contrary to that of an overshot.

It consists in the novel construction and arrangement of certain mechanical devices in connection with the cylinder of the machine, by which the dust (which is usually blown in the feeder's face) caused by the thrashing of the grain is entirely carried off, and the feeder is enabled to feed the machine with more pleasure and less inconvenience than heretofore.

In order to enable others skilled in the art to which my invention appertains to make and use the same, I will now proceed to describe its construction and operation, referring to the annexed drawings, in which—

Figure 1:
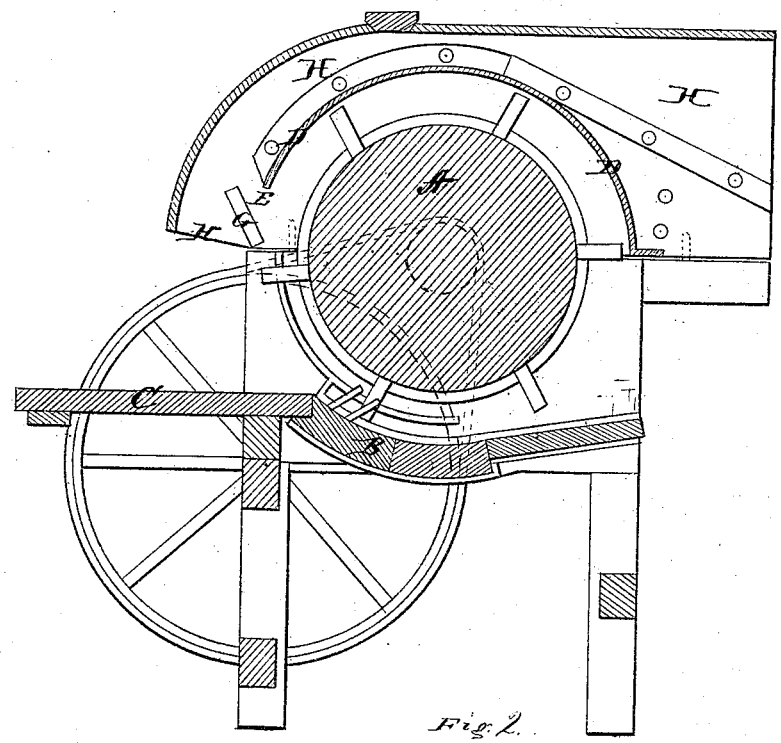
Figure 2:
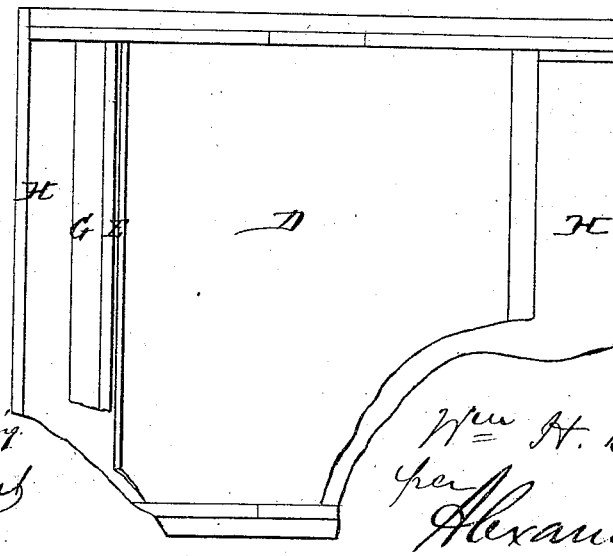

Figure 1 is a longitudinal vertical section of an undershot thrashing-machine with my duster attached, and Figure 2 is a bottom view of the duster.

A represents the usual toothed or spiked cylinder, with the concave B below the same, and the feed-table C so arranged as to admit the grain under the cylinder.

Over the top of the cylinder A is constructed a wind-box, D, for the purpose of gathering the wind generated by the rotation of the cylinder.

At or near the front end of this wind-box is formed a passage, E, for the escape of the wind, and near the same is placed a deflector, G, for the purpose of turning the wind into this passage.

Over the top of the wind-box D is formed what may be called a dust-flue, H. the mouth or front end of which is directly over the feed-table C, and the rear or discharge end is at the rear of the machine.

It is, however, obvious that this dust-flue may be constructed so as to carry the dust in any direction desired.

The operation of my duster is as follows:

As the top of the cylinder revolves toward the front of the machine, the wind generated by the cylinder is blown through the wind-box D to the front of the machine. There it comes in contact with the deflector G, which directs it through the passage E into the dust-flue H, and through the same to the rear of the machine.

It will be observed that the wind blows from rear to front of machine in the wind-box, and from front to rear in the dust-flue. This is caused by the arrangement of the passage and deflector in the wind-box. The wind being blown into the dust-flue, just above the mouth of the same, creates a vacuum or sucking-in of the dust from the front of the machine up into the flue, and there coming in contact with the wind that is entering the dust-flue, and then is blown entirely through to the rear of the machine.

It is obvious that the passage E and deflector G can be placed in other parts of the wind-box, or duplicated if desired.

Having thus fully described my invention,

What I claim as new, and desire to secure by Letters Patent, is—

In combination with an undershot thrashing-machine, as described, the arrangement of the wind-box D, having a passage, E, and deflector G and closed top-casing, with a flue, H, opening above the table, whereby a vacuum is created at the mouth of the flue by the revolutions of the cylinder, and the dust is carried from the feeder up into and out through the flue, as set forth.

In testimony that I claim the foregoing, I have hereunto set my hand this 28th day of January, 1870.

WM. H. BUTTERWORTH.

Witnesses:
ALBERT J. WHITTAKER,
JOHN BUTTERWORTH, Jr.